United States Patent [19]

Doughty

[11] Patent Number: 4,551,581
[45] Date of Patent: Nov. 5, 1985

[54] METHOD AND APPARATUS FOR SENDING A DATA MESSAGE TO A SELECTED STATION DURING A SILENT INTERVAL BETWEEN RINGING

[75] Inventor: Carolyn A. Doughty, Wheaton, Ill.

[73] Assignee: AT&T Bell Laboratories, Murray Hill, N.J.

[21] Appl. No.: 512,955

[22] Filed: Jul. 12, 1983

[51] Int. Cl.[4] .......................................... H04M 11/00
[52] U.S. Cl. .................. 179/2 A; 179/2 DP; 179/5.5; 179/18 B
[58] Field of Search ................. 179/2 R, 2 A, 2 AM, 179/2 AS, 2 DP, 5.5, 5 R, 5 P, 6.16, 18 B, 18 FH, 18 HB, 18 BF, 18 BG, 84 A, 84 R, 84 SS, 84 C, 99 P

[56] References Cited

U.S. PATENT DOCUMENTS

| | | | |
|---|---|---|---|
| 3,727,003 | 4/1983 | Paraskevakos | 178/28 |
| 4,121,053 | 10/1978 | Dick | 179/2 A |
| 4,140,882 | 2/1979 | Regan et al. | 179/84 |
| 4,242,539 | 12/1980 | Hashimoto | 179/5.5 |
| 4,320,258 | 3/1982 | McDonald | 179/18 B |
| 4,355,205 | 10/1982 | Walker | 179/2 AM |
| 4,383,138 | 5/1983 | Castro et al. | 179/2 A X |

FOREIGN PATENT DOCUMENTS

| | | |
|---|---|---|
| 0082512 | 6/1983 | European Pat. Off. . |
| 2720435 | 11/1977 | Fed. Rep. of Germany . |
| 3025462 | 2/1982 | Fed. Rep. of Germany . |
| 2183442 | 12/1973 | France . |

Primary Examiner—Gene Z. Rubinson
Assistant Examiner—W. J. Brady
Attorney, Agent, or Firm—Richard J. Godlewski

[57] ABSTRACT

For use with a telephone switching system serving a plurality of stations and having a central processor for generating data messages and a ringing circuit for generating ringing signals to a selected station, method and apparatus are disclosed for sending a data message to a selected station during a silent interval between ringing signals. The apparatus includes a detector and a sender. Responsive to a first ringing signal, the detector generates a status signal representative of the silent interval between ringing signals. During the silent interval, the sender sends to the selected station a frequency shift keyed signal representative of the data message.

23 Claims, 16 Drawing Figures

SOFTWARE CLOCK INTERRUPT ROUTINE

BASE LEVEL PROGRAM

LINE UNIT ROUTINE

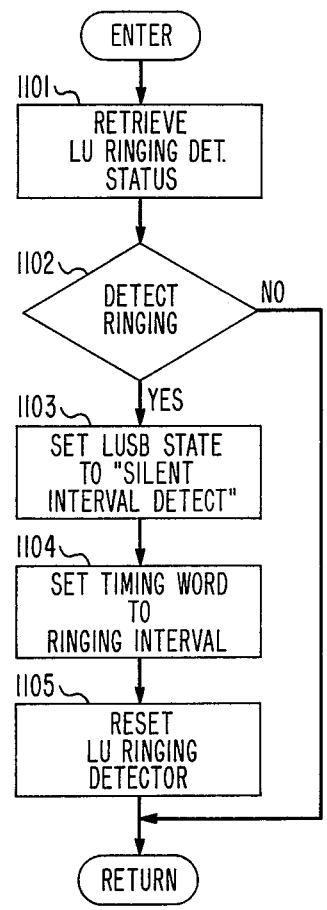

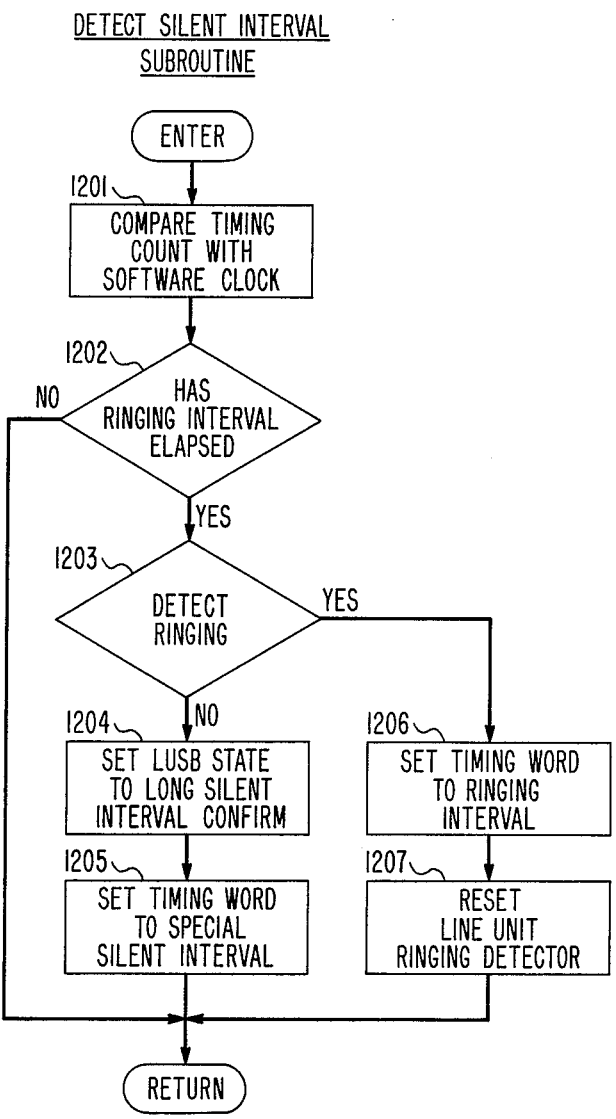

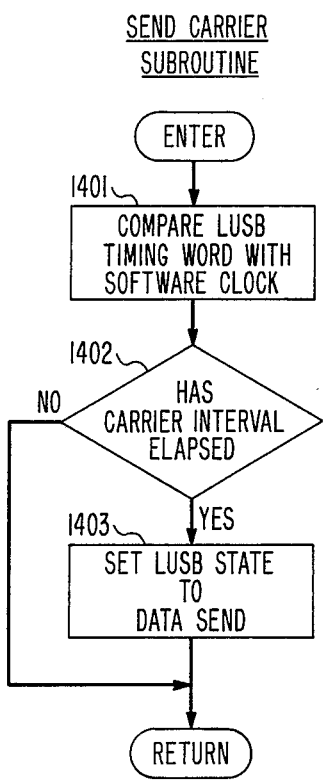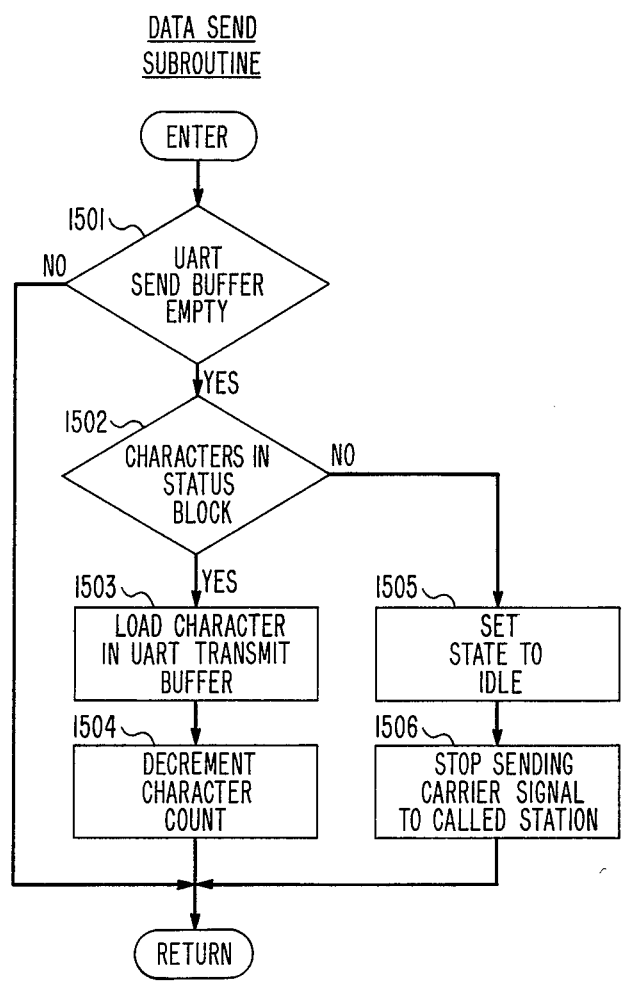

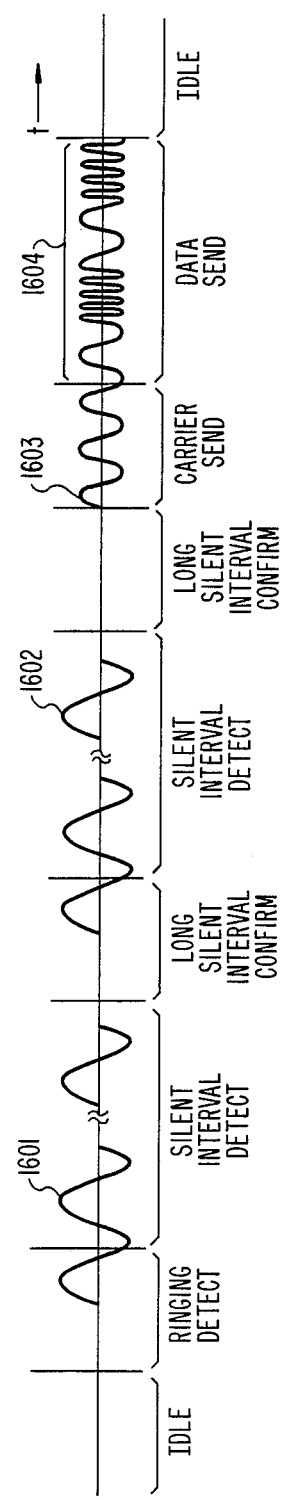

METHOD AND APPARATUS FOR SENDING A DATA MESSAGE TO A SELECTED STATION DURING A SILENT INTERVAL BETWEEN RINGING

CROSS-REFERENCE TO RELATED APPLICATIONS

This application is related to the applications of R. M. Lottes et al., entitled "Method and Apparatus for Providing a Plurality of Special Services, Ser. No. 513,079"; R. W. Foster et al., entitled "Method and Apparatus for Providing Call Tracing Services, Ser. No. 512,956"; and C. A. Doughty, entitled "Method and Apparatus for Displaying a Data Message at a Selected Station during a Silent Interval between Ringing, Ser. No. 513,080", all filed concurrently on July 12, 1983, with this application.

TECHNICAL FIELD

This invention relates to communications systems serving a plurality of stations and particularly to method and apparatus for sending a data message from a telephone switching system to a selected station.

BACKGROUND OF THE INVENTION

In the past, certain special services have been made available to telephone customers to provide them with features which render their telephone usage more convenient and more flexible. For example, these services include call screening, calling number identification, automatic recall and callback, customer-originated call tracing, and others in which special service information is sent to a selected station. This special service information may include a special service indication, the directory number of a called/calling station, personal messages, etc.

Historically, this special service information has been sent to an off-hook station in the form of audio messages from a telephone office announcement system. This is particularly annoying when the customer wants to screen calls prior to answering and respond to only designated parties. In addition, a customer may have initiated several special services at the same time in which the customer is rung back. When rung back, the customer wants to known the identity of the special service or associated party before responding to the ring back signal.

Another solution to providing the customer with special service information is to have a separate data communication link associated with the customer station. However, unless the data link is used with other data processing services, this is a very inefficient and costly approach.

SUMMARY OF THE INVENTION

The foregoing problems are solved and a technical advance is achieved by method and apparatus for sending a data message to a selected station during the silent interval between ringing signals. Used in conjunction with a telephone switching system having a ringing circuit for transmitting ringing signals to a selected station and a central processor for generating data messages, the apparatus comprises a ringing detector and a sender. The ringing detector is responsive to a ringing signal to a selected station for generating a status signal representative of the silent interval between ringing signals. During the silent interval between ringing signals, the sender sends to the selected station a frequency shift keyed signal representative of the data message.

In one illustrative embodiment of the invention, the arrangement comprises a control unit and a plurality of line units each associated with an individual ringing circuit. The central processor of the switching system generates a data message to the control unit, which includes line unit identification and special services information. Each line unit comprises a ringing detector, universal asynchronous receiver transmitter (UART), and a frequency shift keyed (FSK) signal modulator. Responsive to a ringing signal to a selected station from an associated ringing circuit, the ringing detector ascertains the silent interval between ringing signals and so indicates to the control unit. The control unit then loads the UART with the special service information which is serially sent to the FSK signal modulator. The modulator then sends to the selected station during the silent interval between ringing signals a frequency shift keyed signal representative of the special service information.

BRIEF DESCRIPTION OF THE DRAWING

The invention may be better understood from the following detailed description when read with reference to the drawing in which:

FIGS. 9 through 15 show a detailed flow diagram of the routines and subroutines utilized by the control unit to service the line units; and FIG. 16 graphically depicts idealized ringing and data message signals to a selected station with respect to time as well as the state of the line unit status block.

DETAILED DESCRIPTION

Figure 1:
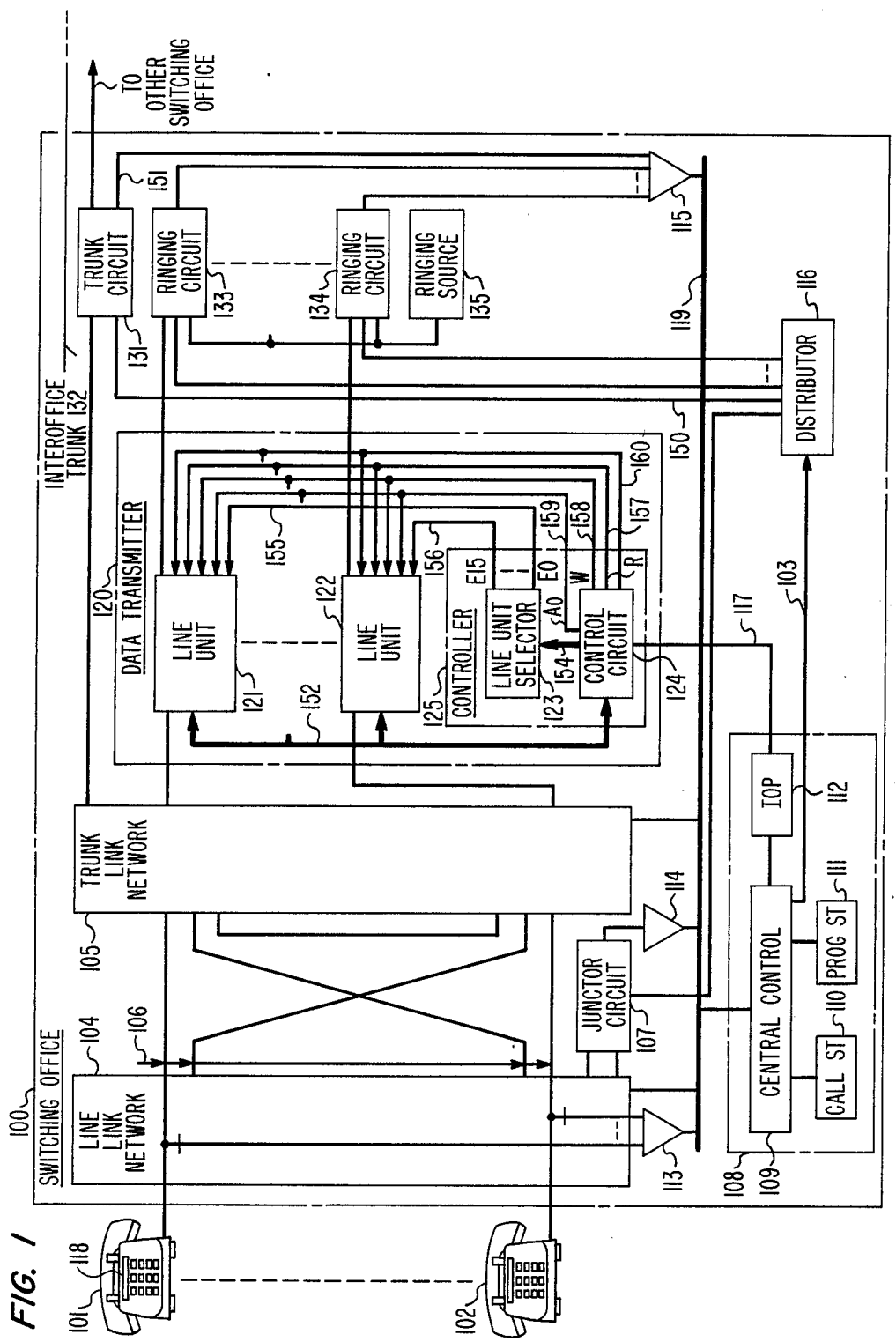
FIG. 1 shows, in block diagram form, a typical stored program-controlled telephone switching system equipped with a data transmitter for sending data messages to a selected station during the silent interval between ringing signals.

The general organization of a system employing the invention is illustrated in the block diagram of FIG. 1 which shows a typical telephone switching office 100 serving a plurality of customer stations such as 101 and 102. By way of example, the telephone switching office is suitably an electronic program-controlled switching system of the type disclosed in U.S. Pat. No. 3,570,008, to R. W. Downing et al. of Mar. 9, 1971, and also disclosed in *The Bell System Technical Journal*, V. 43, No. 5, Parts 1 and 2, September, 1964. These citations may be referred to for a more comprehensive understanding of the construction and operation of the switching system but a brief description will be given herein to illustrate how the invention functions with the switching system.

Switching office 100 comprises line link network 104, trunk link network 105, and a stored program-controlled processor 108. Line link network 104 provides the terminations for customer stations such as 101 and 102, while trunk link network 105 provides terminations for interoffice trunks such as 132 which is terminated at switching office 100 via trunk circuit 131. The trunk link network also provides terminations for ringing circuits such as 133 and 134 and other miscellaneous service circuits which have not been shown to simplify the drawing.

Under the control of central processor 108, any customer may be selectively connected through the line and trunk link networks to a ringing circuit which transmits intermittent ringing signals to the connected station. Between each pair of ringing signals is a silent interval or, more particularly, a period of time in which a ringing signal is not present. Consequently, a called station commonly receives a two second burst of a 20-hertz ringing signal followed by four seconds of silence. This sequence of ringing and silence is normally repeated until the customer at the called station answers or the caller abandons the call. Connected to each of the ringing circuits is ringing source 135 for generating the ringing signals. Coupling the ringing circuits to the trunk link network is data transmitter 120 which sends data messages from processor 108 to the connected station during the silent interval between ringing signals. These messages include special service information such as the directory number of the calling station. The line and trunk link networks are interconnected via wire junctors 106 to permit the interconnection of lines, trunks, and service circuits for call processing under the control of processor 108. Line link network 104 is also interconnected by junctor circuits such as 107 to complete and supervise intraoffice calls.

The majority of the logic, control, storage, supervisory, and translations functions required for the operation of this system are performed by central processor 108. A typical central processor suitable for use in the illustrative switching system is described in *The Bell System Technical Journal*, Vol. 56, No. 2, February, 1977. Processor 108 is a data procesing facility and can functionally be divided into central control 109, call store 110, program store 111, and input-output processor 112, plus maintenance apparatus which has not been shown to simplify the drawing.

Call store 110 is a memory for storing translation and routing information in addition to temporary information relating to calls in progress and special services. For example, this temporary information includes the busy/idle status of circuits and stations, the directory numbers of calling and called stations, special service indicators, etc.

Program store 111 is a memory for storing program instructions which direct the central control to sequentially perform its many functions.

Central control 109 is the information processing unit of the system that executes the program instructions stored in program store 111 using temporary information stored in call store 110.

Input-output processor 12 interfaces with peripheral units such as data transmitter 120 via serial data links. For example, responsive to a message from central control 109, the I/O processor sends the message to data transmitter 120 via serial data link 117.

Processor 108 interfaces with lines, trunks, and service circuits via scanners 113 through 115 and distributor 116. Distributor 116 responds to an order over bus system 103 from the central control to apply pulses to distribution points connected to various peripheral units of equipment. For example, in response to an appropriate order, distributor 116 signals over conductor 150 to actuate apparatus such as relay in trunk circuit 131.

Scanners 113 through 115 are used to gather information for the central control by monitoring leads connected to the various peripheral units and customer stations. Thus, when a trunk circuit such as 131 changes state as a result of a seizure from a distant originating switching office, a signal is transmitted via conductor 151 to scanner 115. Similarly, scanner 115 recognizes changes of state in ringing circuits such as 133 and 134 in order to ascertain a ring-trip signal from a called customer station. Scanners 113 and 114 recognize the off-hook/on-hook condition of customer stations such as 101 and 102. Periodically, the scanners are addressed by central control 109 over bus system 119 to determine the state of the peripheral units and customer stations.

In accordance with this invention, data transmitter 120 sends a data message from central processor 108 to a selected on-hook station during the silent interval between ringing signals. As previously suggested, these messages include information to provide special customer services. For example, let it be assumed that the customer at station 102 desires to call the customer at station 101. The customer at calling station 102 lifts his receiver off hook at which time dial tone is returned to the station. The customer then dials or enters the directory number of called station 101, and central control 109 reads the dialed digits received by a digit receiver (not shown) and stores them in a temporary call register in call store 110. Under the control of a digit analysis program and through the use of translation tables in call store 110, central control 109 determines the disposition of the call. Recognizing that the dialed digits correspond to the directory number of called station 101, central control translates the directory number to an equipment number which designates the termination of called station 101 on the line link network. A ringing circuit such as 133 is then connected through the line and trunk link networks to called station 101.

In this illustrative embodiment, called customer station 101 has been provided with a plurality of special services which includes displaying the directory number of the calling station. To display the directory number of calling station 102 at called station 101, a data message which includes the directory number of calling station 102 is sent by central control 109 to data transmitter 120. Connected between ringing circuit 133 and trunk link network 105 the data transmitter in turn processes the data message and sends to called station 101 the directory number of calling station 102. The directory number of calling station 102 is then exhibited at display 118 of called station 101 which is a LED or the like display station set. Reference to the copending application of this inventor, entitled "Method and Apparatus for Displaying a Data Message during a Silent Interval between Ringing, Ser. No. 513,080", is made for a description of such a display station set and is hereby incorporated by reference.

Data transmitter 120 comprises a plurality of line units such as 121 and 122 and controller 125 which comprises line unit selector 123 and control circuit 124. Line unit 121 connects the tip and ring leads of ringing circuit 133 to terminations on trunk link network 105 which are selectively connected to the tip and ring leads of called station 101. Thus, coupled to the tip and ring leads of ringing circuit 133 and called customer station 101, line unit 121 transmits the directory number of calling station 102 as well as other special service information to called station 101 using well-known frequency shift keyed signaling. The frequency shift keyed signal represents the high and low logic levels of special service information which is received from control circuit 124 via data bus 152. Line unit 121 is selected to receive this special service information in response to an enable signal from line unit selector 123.

Control circuit 124 is the processing unit of data transmitter 120. In response to a data message which includes line unit identification, a data character count, and special service information from processor 108, control circuit 124 sends a line unit address signal to line unit selector 123 via address bus 154. The line unit selector translates the line unit address signal to an enable signal which is sent to the indentified line unit via a dedicated conductor such as EO conductor 155 to line unit 121. Similarly, enable signals are sent to line unit 122 via dedicated E15 conductor 156. Common to all the line units are read (R), write (W), addres bit (AO), and clock conductors 157 through 160. The signals on these conductors from control circuit 124 cause a selected line unit to perform various functions.

Figure 2:
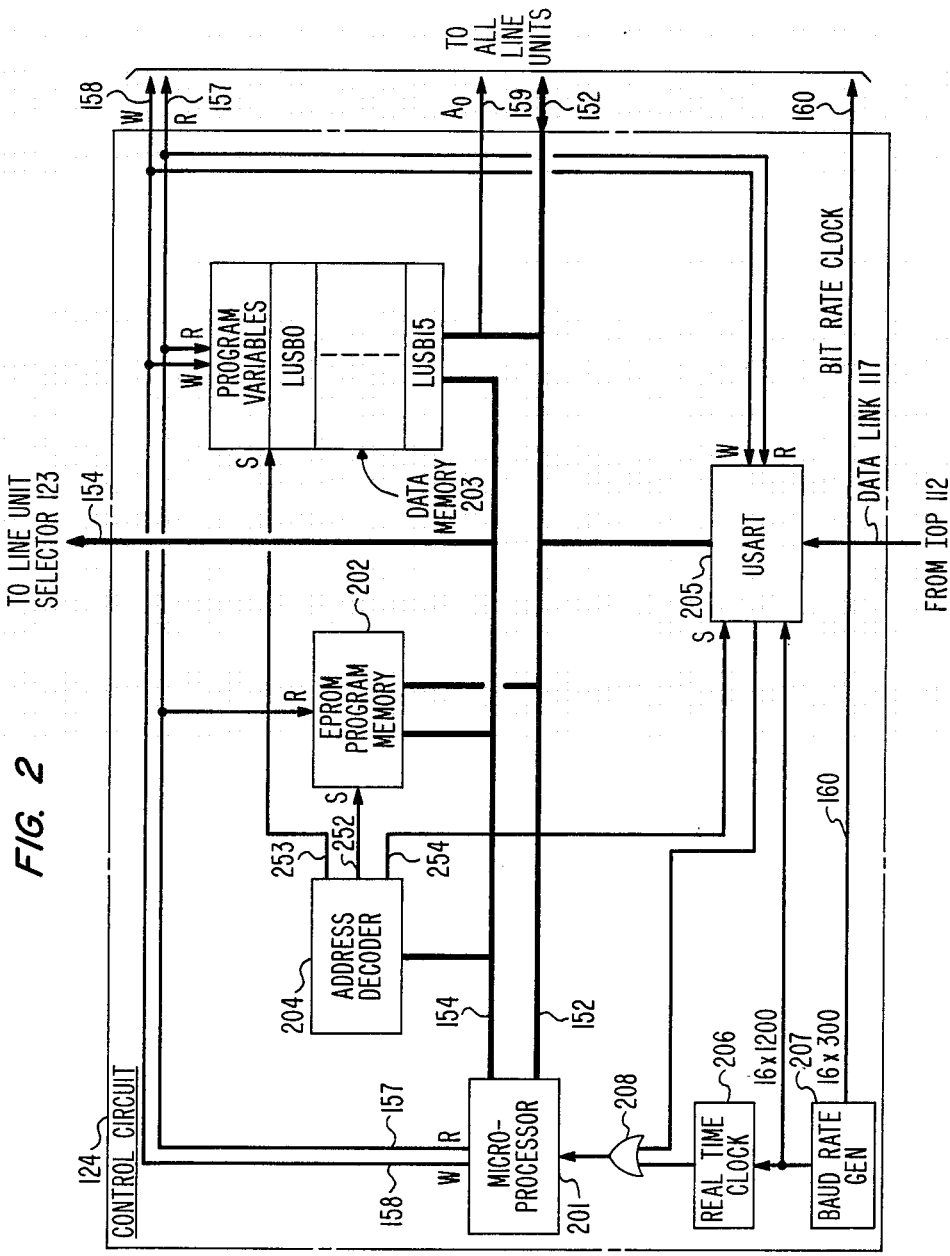
FIG. 2 shows a more detailed block diagram of the control circuit of the data transmitter.

Depicted in FIG. 2 is a block diagram of control circuit 124 which performs three basic operations; namely, it receives messages from processor 108, maintains a software clock, and services line units. Control circuit comprises microprocessor 201, program memory 202, data memory 203, address decoder 204, universal synchronous asynchronous receiver transmitter (USART) 205, real-time clock 206, and baud rate generator 207 which are all well-known and commercially available units. Also included are data bus 152 and address bus 154 which interconnect the various units as shown. Common to the various units of the control circuit are read (R) and write (W) conductors 157 and 158 for conveying read and write signals from microprocessor 201 to the other devices of the control circuit as well as the line units. Individual select (S) conductors 252, 253, and 254 from address decoder 204 are used to access program memory 202, data memory 203, and USART 205, respectively.

Data memory 203 is a temporary and erasable memory such as a random access memory for storing information related to specific calls in progress. The data memory is segmented into status blocks each dedicated to a single line unit and an additional block for storing program variables.

Figure 3:
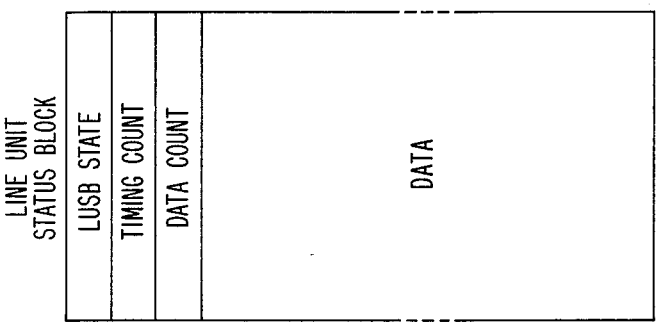
FIG. 3 depicts the memory layout of an individual line unit status block in the data memory of the control circuit.

Depicted in FIG. 3 is the layout of a single line unit status block (LUSB) which is segmented to store a LUSB state, a timing count, a data character count, and data characters.

Program memory 202 is a permanent memory such as an erasable programmable read only memory (EPROM) and stores program instructions which direct microprocessor 201 to sequentially perform its many functions.

Microprocessor 201 is the information processing unit of the control circuit and executes the program instructions stored in program memory 202 to send line unit address signals and special service information to the various line units. Furthermore, receiving a data message from processor 108, microprocessor 201 loads the data character count and special service information portions of the message into an identified message line unit status block.

Universal synchronous asynchronous receiver transmitter (USART) 205 interfaces with microprocessor 201 to receive serial data messages from processor 108. These serial data messages are converted by USART 205 to a parallel format which may be interpreted by microprocessor 201. As previously described, these serial format data messages include line unit identification, a data character count, and special service information. The special service information includes data characters which represent the individual digits of a directory number and a message type character which designates the directory number as that of a calling station.

Responsive to address signals received on address bus 154 from microprocessor 201, address decoder 204 selects program memory 202, data memory 203, and USART 205 to receive address signals on address bus 154 and data on data bus 152 in a well-known manner.

Real-time clock 206 and baud rate generator 207 interact with each other to generate a plurality of interrupt and timing signals having various bit rates. Baud rate generator 207 generates clock signals having different bit rates. For example, one clock signal has a bit rate of $16 \times 300$ baud and is sent to all the line units via conductor 160. Another clock signal having, for example, a bit rate of $16 \times 1200$ baud causes USART 205 to receive 1200 baud serial messages from processor 108. Responsive to the $16 \times 1200$ baud clock signal, real-time clock 206 generates periodic interrupt signals to microprocessor 201 via logic OR gate 208. This interrupt signal causes the microprocessor to advance the count of a software real-time clock in the program variables portion of data memory 203. Microprocessor 201 also receives another interrupt signal from USART 205 via logic OR gate 208 when a complete data character (byte) has been received from processor 108.

As previously mentioned, control circuit 124 performs three basic operations as a result of program instructions in program memory 202 for microprocessor 201. The first operation involves receiving a data message from processor 108 and storing the data character count and special service information of the message into the line unit status block of the identified line unit. Receiving the first character of the serial data message via data link 117, USART 205 stores the byte of data in a receive buffer register and sends an interrupt request signal to microprocessor 201. This causes microprocessor 201 to call an input interrupt routine which is stored in program memory 202.

Figure 6:
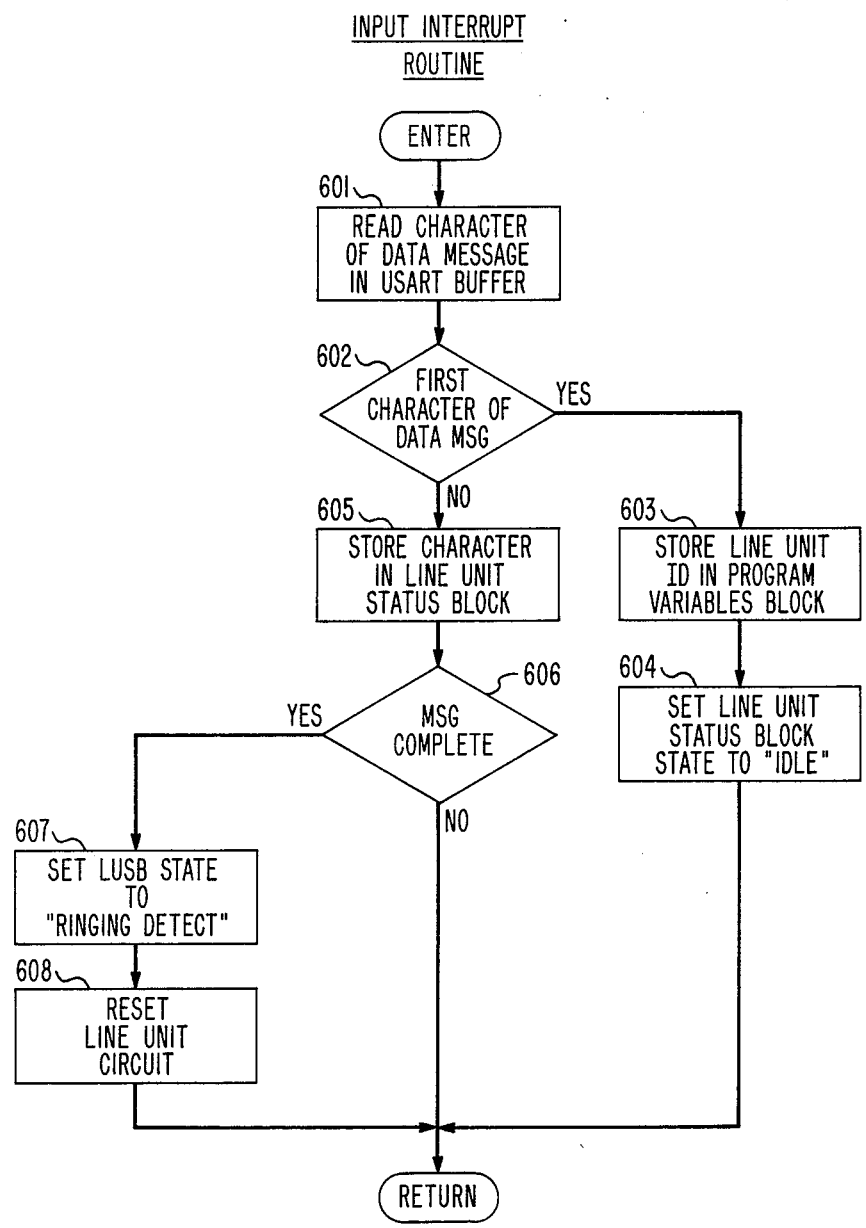
FIG. 6 shows a detailed flow diagram of an input interrupt routine used by the transmitter to receive and store data message from the central processor.

Depicted in FIG. 6 is the INPUT INTERRUPT routine which controls the loading of the data message characters into the indentified line unit status block. Under the control of this routine, microprocessor 201 addresses USART 205 in a well-known manner and reads the byte stored in the receive buffer register of USART 205 (block 601). Recognizing this byte as the first character of a message (block 602) which is the line unit identification, the microprocessor stores the line unit identification in the program variables block (block 603) and sets the state of the identified line unit status block to "idle" (block 604). Control is then returned to the base level program which services the other line units until another interrupt signal is received from USART 205.

Receiving the second character of the message, USART 205 sends another interrupt signal to microprocessor 201 to read the USART buffer. Again, the interrupt routine is called to cause the microprocessor to read the character in the USART buffer (block 601). The second character of the message is the data character byte count and is stored in the data count portion of the identified line unit status block (block 605). The data count specifies the number of subseqent data characters to be received for this message and is decremented each time a character is received until the entire message has been received (block 606). The data count is also used by the microprocessor to specify the length of the message which is sent to the selected station. Once agin, control is returned to the base level program until the next byte is loaded in the USART buffer.

The next character of the message is special service information such as the message type that is to be sent to the selected station. The INPUT INTERRUPT routine is called again, and the character is stored in the data segment of the status block for the identified line unit. This operation continues until all of the special service information of the data message such as the individual digits of the calling station directory number have been received after which the state of the line unit status block is advanced to "ringing detect" (block 607). Microprocessor 201 then sends line unit address and read signals to reset the ringing detector of the identified line unit (block 608). Control is then returned to the base level program.

Figure 7:
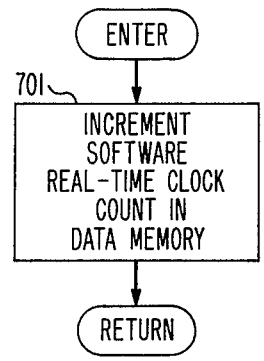
FIG. 7 shows a flow diagram of a routine utilized by the data transmitter to increment a software real-time clock count.

The second operation performed by control circuit 124 is to advance the count of a software real-time clock, which is a program variable stored in data memory 203. Responsive to a periodic interrupt signal from real-time clock 206 which is generated, for example, every 10 milliseconds, microprocessor 201 calls a SOFTWARE CLOCK INTERRUPT routine which is depicted in FIG. 7. As shown, this routine causes the microprocessor to increment the software real-time clock count in the program variables portion of data memory 203. This real-time clock count and the timing count in each of the line unit status blocks are then compared to perform various timing and waiting functions which will be described hereinafter.

The third operation performed by control circuit 124 is to periodically service each one of a plurality of line units based on the state of the line unit status block. These services will be described after a further description of data transmitter 120.

Figure 4:
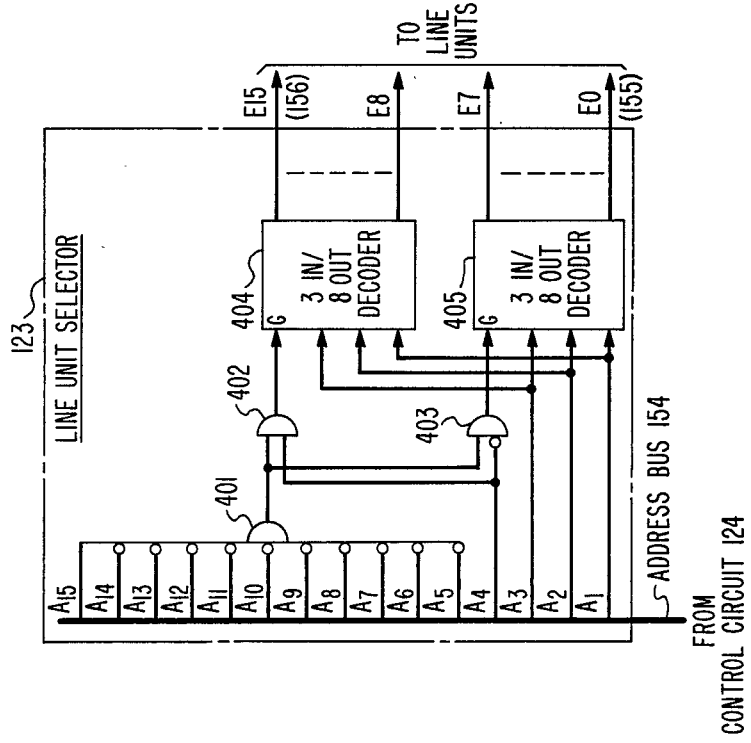
FIG. 4 shows a more detailed block diagram of the line unit selector for translating line unit address signal from the control circuit to a dedicated enable signal for the identified line unit.

Controller 125 of the data transmitter also comprises line unit selector 123 which is depicted in FIG. 4. Line unit selector 123 translates bits A1 through A15 of a line unit address signal on address bus 154 from microprocessor 201 to a dedicated enable signal for the identified line unit. Line unit selector 123 comprises well-known and commercially available logic gates 401–403 and two, 3-to-8 decoders 404 and 405 which are connected to translate 15 bits of a 16-bit address signal to a dedicated enable signal for one out of 16 possible line units. With access to 15 bits of a typical 16-bit address bus, logic AND gate 401 is responsive to the upper 11 bits (A5–A15) of address bus 154 to select a valid line unit address field. When gate 401 is active, logic AND gates 402 and 403, along with decoders 404 and 405, are active to translate address bits A1 through A4 to a line unit enable signal on one of dedicated line unit conductors E0 through E15. Responsive to address bit A0 via A0 conductor 159 (FIG. 1), the enabled line unit assumes one of several states as will be described hereinafter.

Figure 5:
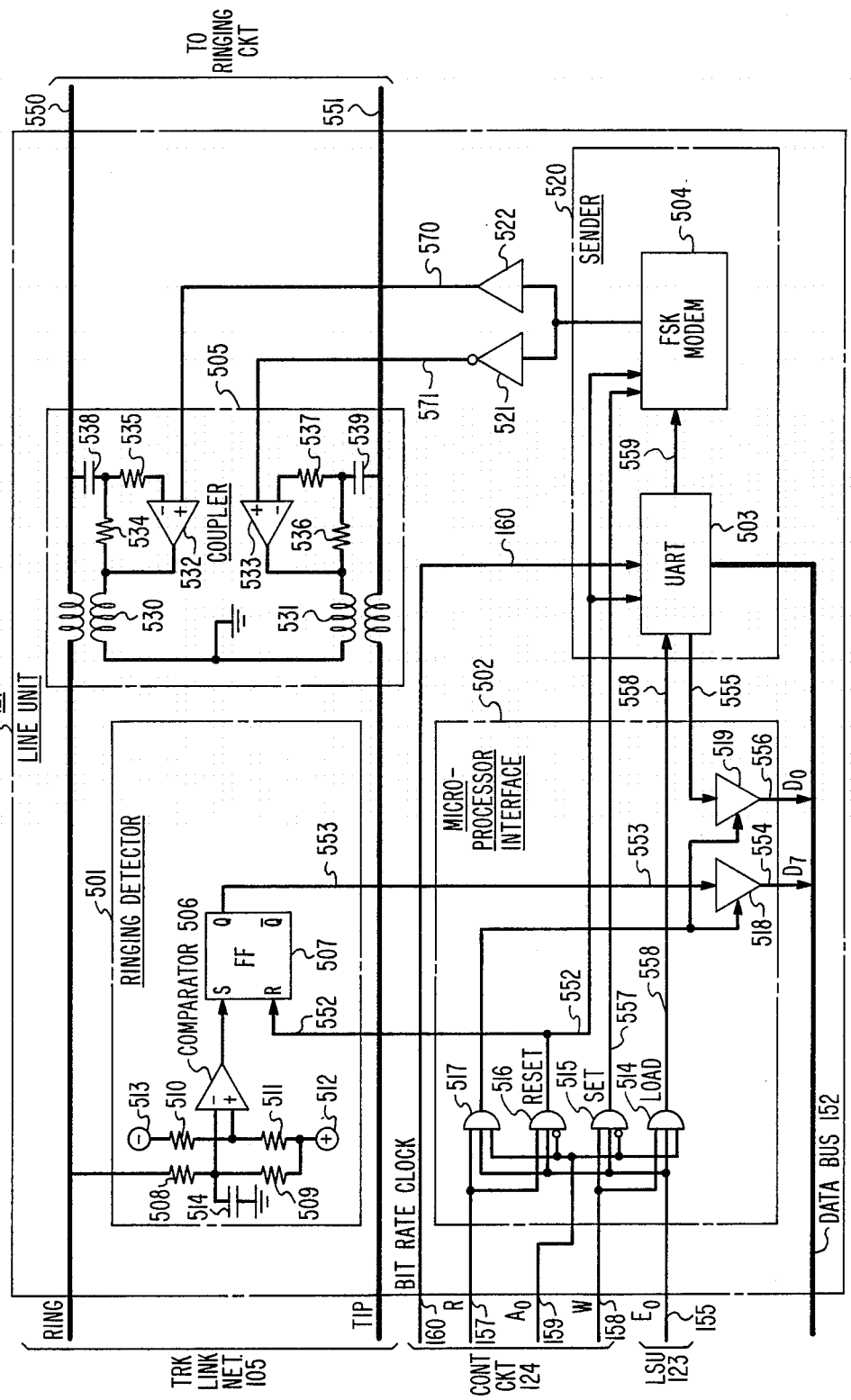
FIG. 5 shows a more detailed block diagram of one of a plurality of line units of the data transmitter.

Data transmitter 120 also comprises a plurality of line units such as 121 which is depicted in FIG. 5. Line unit 121 connects tip and ring leads 550 and 551 of ringing circuit 133 to those of called station 101. Line unit 121 detects ringing signals on the ring lead as well as the silent interval between ringing signals. During the silent interval, the line unit sends to the on-hook called station a frequency shift keyed signal which represents the characters of the special service information. Included in this special service information is the type and length of the message. The first character sent is the message type which, in this embodiment, specifies a calling station directory number. The second character represents the length of the message to be sent to the called station. The message length is derived by the microprocessor from the data character count stored in the identified line unit status block. After the message length character are characters which represent the digits of the directory number. Following the directory number characters is a check sum or other error detection character which is used to detect errors in transmission. In this illustrative embodiment, the special service information represents the directory number of the calling station but may represent the directory number of a called station or include another special service indicator, a personal message, the time of day, etc.

As shown in FIG. 5, line unit 121 comprises ringing detector 501, microprocessor interface 502, coupler 505 and sender 520 which comprises universal asynchronous receiver transmitter (UART) 503 and frequency-shift-keyed (FSK) modem 504. Ringing detector 501 comprises comparator 506 and latch 507 such as an SR-type flip-flop for detecting a ringing signal as well as the silent interval between ringing signals on ring lead 550. Generated by the ringing circuit, this ringing signal typically comprises a 20 hertz, 86 volt RMS sinewave superimposed on −48 volts. Comparator 506 which is a commercially available device is biased to change state and "set" flip-flop 507 when a voltage such as −100 volts is present on ring lead 550. This predetermined voltage level is established at the plus input terminal of the comparator by voltage divider resistors 510 and 511 which are serially connected between positive and negative potential sources 512 and 513, respectively. The voltage on the ring lead is applied to the negative terminal of the comparator via voltage divider resistors 508 and 509 which are serially connected between ring lead 550 and positive potential source 512. In addition, filter capacitor 512 is connected to voltage divider resistors 508 and 509 to prevent spurious voltage spikes from triggering the comparator. Thus, when a ringing signal is present on ring lead 550, comparator 506 sets flip-flop 507 via the S input terminal. Microprocessor interface 502 periodically resets the flip-flop via the R input terminal and RESET conductor 552 to detect the silent interval between ringing signals. The state of flip-flop 507 is present on the Q output terminal and is applied to the microprocessor interface via conductor 553. Hence, once ringing has been detected and the flip-flop has not been set for a predetermined interval such as 90 millistatus block, the microprocessor calls an associated subroutine (blocks 902 through 907).

The IDLE subroutine is depicted in FIG. 10. When the line unit status block is in the "idle" state, the associated line unit and ringing circuit have not been connected to a called station, and no action on the part of the line unit is required. Control is immediately returned to the LINE UNIT routine which, in turn, causes the microprocessor to call the LINE UNIT routine for the next line unit as depicted in the base level program cycle of FIG. 8.

The DETECT RINGING subroutine is is depicted in FIG. 11. When the line unit status block is in the "ringing detect" state, processor 108 has connected the line unit and ringing circuit to a called station and sent the directory number of the calling station to be loaded in the data area of the status block. As previously decribed, when a ringing signal is on the ring lead of the called station, ringing detector 501 sets SR flip-flop 507 whose state represents the state of the ringing detector. The microprocessor retrieves the ringing detector state by reading an odd address bit A0 of the enable line unit and receiving the ringing detector status on bit D7 of data bus (block 1101). When the status bit represents ringing, the microprocessor writes the state of the line unit status block to "silent interval detect" (block 1103). In addition, the timing count of the line unit status block is written to represent a ringing interval such as 50 milliseconds which is the period of a 20-hertz signal (block 1104). Even address A0 bit of the enabled line unit is then read to "reset" the ringing detector flip-flop (block 1105). Once again, control is returned to the line unit routine and then the base level program to service the next line unit.

The DETECT SILENT INTERVAL subroutine is depicted in FIG. 12. Under the control of this subroutine, the microprocessor compares the timing count of the line unit status block with the software real-time clock count in the program variables portion of data memory 203 (block 1201). As previously described, the software clock count is incremented in a well-known manner each time the microprocessor receives an interrupt signal from real-time clock 206. This interrupt signal may occur, for example, every 10 milliseconds. When the 50 millisecond ringing interval has not elapsed (block 1202), control is returned to the line unit routine since sufficient time has not elapsed to complete one cycle of the 20-hertz ringing signal. When the 50 millisecond ringing interval has elapsed (block 1202), the state of the ringing detector is checked to determine whether another cycle of the ringing signal has been detected on the ring lead of the called station (block 1203). When another cycle of the ringing signal is not detected on the line, microprocessor 201 sets the line unit status block state to "long silent interval confirm" (block 1204) and writes the timing count for a special silent interval such as 300 milliseconds (block 1205). When another cycle of the ringing signal is detected on the ring lead, the microprocessor again sets the timing count to the ringing interval (block 1206) and reads even address bit A0 of the enabled line unit to reset the line unit ringing detector (block 1207). Once again, control is returned to the line unit routine.

Figure 13:
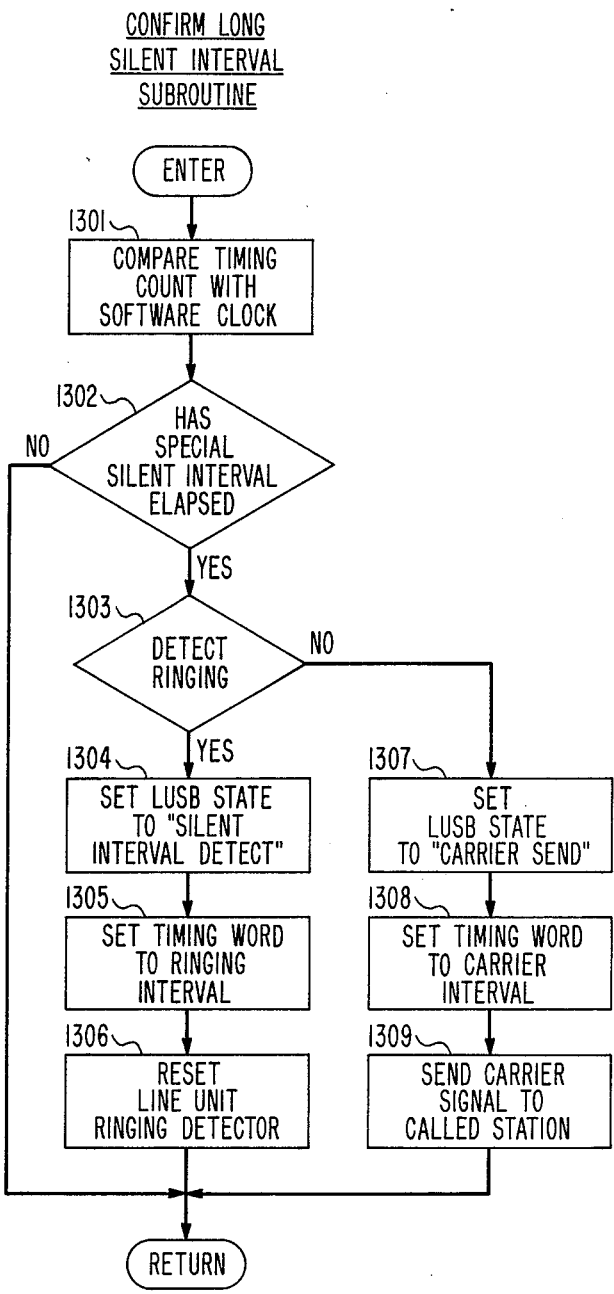

Depicted in FIG. 13 is the CONFIRM LONG SILENT INTERVAL subroutine which is used to wait for the lapse of the special silent time interval initiated by the DETECT SILENT INTERVAL subroutine. After waiting for the completion of the special silent time interval, a check is made to determine whether another ringing signal has been detected. When another ringing signal is detected, the line unit status block is set to detect the next silent interval. When the continuance of the silent interval is confirmed, the status block is set to send a single frequency FSK signal to the called station. Under control of the CONFIRM LONG SILENT INTERVAL subroutine, microprocessor 201 compares the timing count of the line unit status block with the software real-time clock count (block 1301) to determine whether the special silent interval has elapsed (block 1302). Recognizing that the special silent interval has not elapsed, control is immediately returned to the line unit routine. When the interval has elapsed, the state of the ringing detector is checked to determine whether another ringing signal is on the ring lead of the called station (block 1303). This is done to assure that the present silent interval is not a short interval associated with special ringing signals for various special services. When ringing for these special services is detected, the microprocessor again sets the line unit status block state to "silent interval detect" (block 1304) and writes the timing count to the ringing interval (block 1305). In addition, the ringing detector is "reset" (block 1306).

Recognizing that a ringing signal has not been detected and that a normal silent interval such as 4 seconds between ringing signals has been entered, the microprocessor sets the state of the line unit status block to "carrier send" (block 1307) and writes the timing count to a carrier interval such as, for example, 90 milliseconds (block 1308). Even address bit A0 of the enabled line unit is then written by the microprocessor to cause the line unit to send a single frequency FSK signal on the tip and ring leads of the called station (block 1309). After this, control is returned to the line unit routine.

The SEND CARRIER subroutine is depicted in FIG. 14 and is implemented to send a single frequency (unmodulated) FSK signal to the called customer station. This initializes the station set to receive the special service information which includes the directory number of the calling station. Microprocessor 201 compares the line unit status block timing count with the software real-time clock count (block 1401) to determine whether the carrier interval has elapsed (block 1402). When the carrier interval has elapsed, the microprocessor sets the state of the line unit status block to "data send" (block 1403) and returns control to the line unit routine. Otherwise, control is returned to the line unit routine.

The SEND DATA subroutine is called to send a character of the special service information to the called station and is depicted in FIG. 15. Microprocessor 201 first determines whether the UART transmit buffer register is empty (block 1501). This is accomplished by the microprocessor reading odd address bit A0 of the enabled line unit which causes the status of the UART to be returned on bit D0 of the data bus. When the status bit indicates that the buffer is empty, the data count of the line unit status block is checked to determine whether any data characters remain in the data storage area (block 1502). If not, control is returned to the line unit routine. When data characters are present, the first character of data is loaded into the UART transmit buffer register via the data bus (block 1503). This is accomplished by the microprocessor writing odd address bit A0 of the enabled line unit. In addition, the data count of the status block is decremented each time seconds, it is assumed that a silent interval between ringing signals has been entered.

In response to a combination of read, write, enable, and address signals from the line unit selector and control circuit, microprocessor interface 502 causes the line unit to assume one of two modes (control and data) and perform various functions. The interface reports the state of the ringing detector and UART on respective bits D7 and D0 of data bus 152 when requested by the control circuit. Each line unit is controlled by line unit selector 123 and microprocessor 201 via control signals received by microprocessor interface 502 on enable (E0), read (R), write (W), and address bit A0 conductors 155 and 157 through 159. In addition, data is transferred from microprocessor 201 to the line unit via data bus 152.

The microprocessor interface comprises logic gates such as AND gates 514 through 517 and well-known three-state buffer devices 518 and 519 which are connected as shown. Decoding read, write, enable, and address signals from line unit selector 123 and control unit 124, logic AND gates 514 through 516 generate load, set, and reset signals on corresponding conductors 558, 557, and 552. In addition, logic AND gate 517 causes three-state devices 518 and 519 to gate the state of ringing detector 501 and UART 503 onto bits D7 and D0 of data bus 152 via conductors 554 and 556, respectively.

The mode of each line unit is controlled via address signal bit A0 which assumes either a high ("1") or a low ("0") logic level. Thus, address signal bit A0 designates either an odd ("1") or an even ("0") address. Remaining bits A1 through A15 of the address signal from the microprocessor are interpreted by the line unit selector to send a dedicated enable signal to the identified line unit. The enable, address bit A0, read, and write signals are translated by interface 502 to cause ring detector 501, UART 503, and FSK modem 504 to perform their various functions. When the microprocessor "reads" an odd address bit A0 of an enabled line unit, the line unit causes several status bits such as D0 and D7 to be gated on the data bus. Status bit D0 represents the state of the transmit buffer register of UART 503, whereas status bit D7 represents the state of ringing detector flip-flop 507. When status bit D7 is "set", a ringing signal was detected on the ring lead since the last reset signal. When status bit D7 is "reset", a ringing signal has not been detected on the ring lead since the last reset signal. Similarly, a "set" status bit D0 represents that the transmit buffer register of UART 503 is empty, and a "reset" bit represents that data is in the transmit buffer register of the UART.

When the microprocessor "writes" an odd address bit A0 of an enabled line unit, the interface causes data on data bus 152 to be written into the transmit buffer register of the UART by sending a load signal via LOAD conductor 558.

Writing and reading an even address bit A0 causes the line unit to assume one of two modes. "Reading" an even address bit A0 causes the line unit to assume a control mode, thereby resetting ringing detector 501, UART 503, FSK modem via RESET conductor 552. "Writing" an even address bit A0 causes the line unit to assume a data mode, thereby setting the FSK modem via SET conductor 557. This causes the FSK modem to generate a single frequency FSK signal.

Universal asynchronous receiver transmitter (UART) 503 is a well-known and commercially available device for converting parallel format data on data bus 152 to a serial format for FSK modem 504. Responsive to the load signal from interface 502, a parallel format data byte is gated into the transmit buffer register of UART 503 in a well-known manner. In response to the bit rate clock signal on conductor 160, the UART serially shifts the data byte out of the transmit buffer register into FSK modem 504 on conductor 559, again, in a well-known manner. When all of the data byte has been shifted out of the transmit buffer register, the UART sends a buffer empty signal to the interface via conductor 555. This buffer empty signal is then gated onto bit D0 of the bus by three-state buffer 519 via conductor 556. When a reset signal is received from the interface, the UART transmit buffer register is cleared, and a buffer empty signal is returned.

FSK modem 504 is a well-known and commercially available modulator and demodulator which generates a frequency shift keyed signal representative of the logic levels of the data byte received from UART 503. Receiving a "set" signal from the interface causes the modem to send one of the two FSK frequencies to the called station via coupler 505. Receiving a "reset" signal causes the modem to stop transmission of any FSK signal.

Coupler 505 applies the FSK signal from modem 504 in a balanced manner to the tip and ring leads of ringing circuit 133 and called station 101. The coupler comprises low-impedance coupling transformers 530 and 531, operational amplifiers 532 and 533, feed-back resistors 534 through 537, and coupling capacitors 538 and 539 for the operational amplifiers connected as shown. The secondary winding of transformer 530 is serially connected to RING lead 550 and presents a low impedance to the 20 hertz ringing signal. Serially connected between the output of operational amplifier 532 and ground, the primary of transformer 530 magnetically couples the amplified FSK carrier signals on conductor 570 from amplifier 522 which amplifies the FSK signals from FSK modem 504. Likewise, transformer 531 and operational amplifier 533 are connected to TIP lead 551 to apply the FSK signal on conductor 571 from inverter 521. Inverter 521 inverts the FSK signal from FSK modem 504 such as to have an amplitude equal in magnitude and opposite in polarity to the FSK signal on conductor 570. Thus, the two FSK signals are applied in a balanced manner to the tip and ring leads of the called station during the silent interval between ringing signals.

Figure 8:
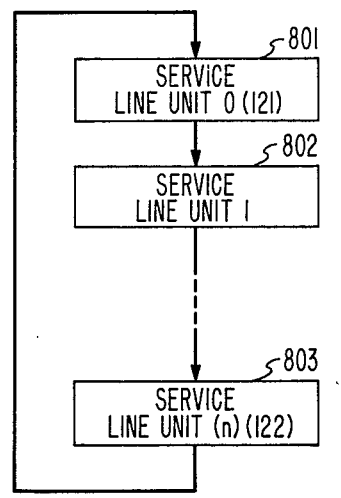
FIG. 8 shows a flow diagram of a base level program utilized by the control unit of the transmitter to service each of the line units.
Figure 9:
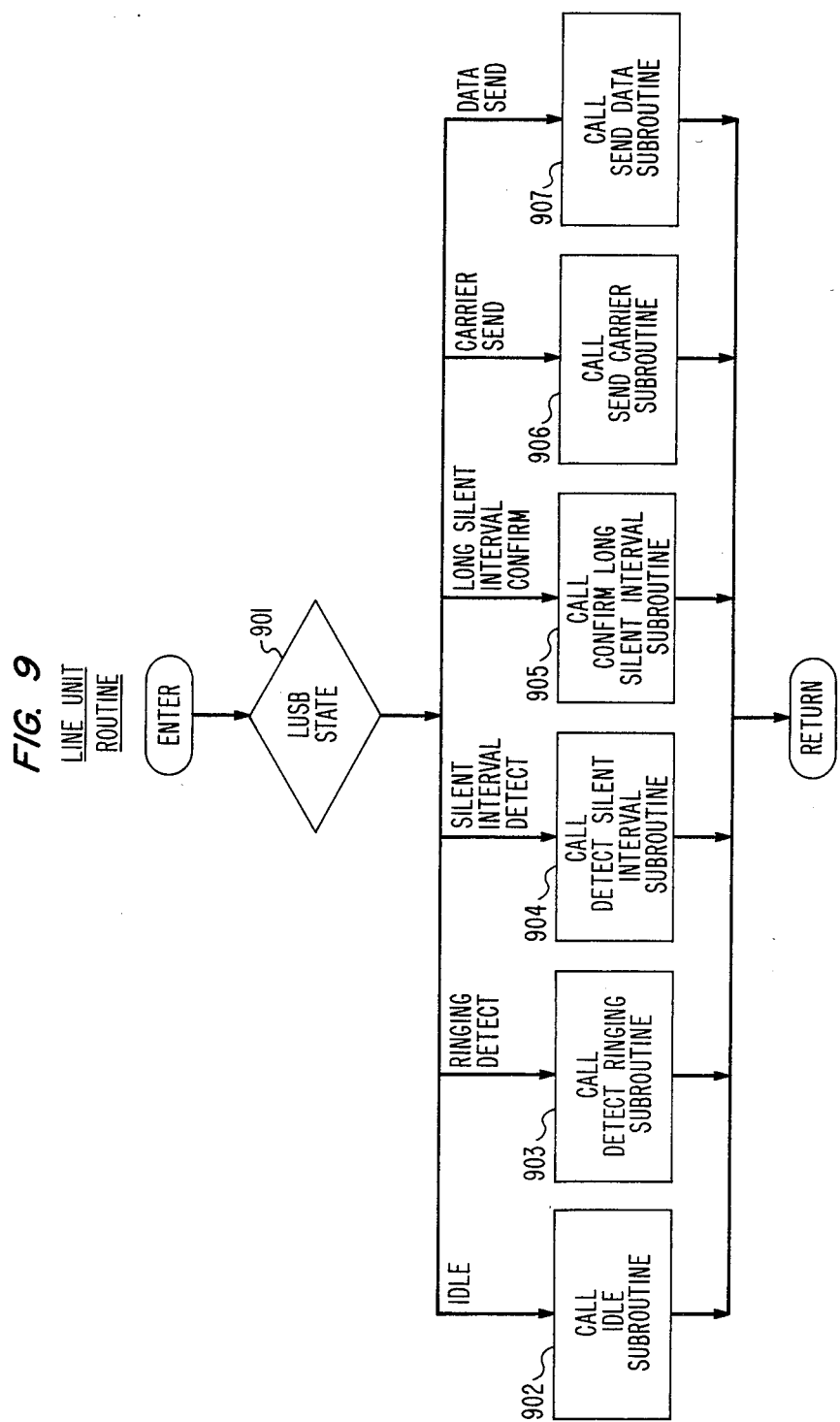

To illustrate the operation of this novel arrangement for sending special service information such as the directory number of the calling station to the called station during the silent interval between ringing signals, the reader's attention is directed to the flow diagram of FIGS. 8 through 15. Depicted in FIG. 8 is the base level program stored in program memory 202, which is executed by microprocessor 201. As a result of this program, the microprocessor periodically services each one of a plurality of line units 0 through (n). For example, to service line unit 0 (121), the microprocessor calls a LINE UNIT routine which is depicted in FIG. 9. The microprocessor first determines the state of the line unit status block (LUSB) in data memory 203 for the particular line unit (block 901). In this illustrative embodiment, the LUSB state may assume any one of six possible states: "idle", "ringing detect", "silent interval detect", "long silent interval confirm", "carrier send", and "data send". Having determined the state of the line unit 3. The apparatus in accordance with claim 1 in which said detector means comprises comparator means responsive to a predetermined voltage level and said first ringing signal for generating said status signal when the magnitude of said ringing signals is less than the magnitude of said predetermined voltage level and latch means for storing said status signal.

4. The apparatus in accordance with claim 1 in which said sender means comprises transmitter means for storing said data message from said central processor and modulator means for generating a first frequency shift keyed signal representative of said stored data message.

5. For use with a telephone switching system serving a plurality of stations and having a central processor for generating a data message and a ringing circuit for transmitting a first and a second ringing signal to a selected one of said stations, said first and second ringing signals having a silent interval therebetween, apparatus for sending a data message to a selected station during the silent interval between ringing signals; comprising:
    detector means responsive to said first ringing signal for generating a status signal representative of said silent interval between said first and second ringing signals;
    sender means responsive to said status signal for sending to said selected station a first frequency shift keyed signal representative of said data message during said silent interval; and
    means responsive to said first frequency shift keyed signal for generating a second frequency shift keyed signal having a voltage level equivalent in magnitude and opposite in polarity to that of said first frequency shift keyed signal.

6. The apparatus in accordance with claim 5 wherein a tip and a ring lead interconnect said ringing circuit and said selected station and in which said apparatus further comprises first and second transformers each having a primary and a secondary winding, the secondary winding of said first transformer being connected to said ring lead, the secondary winding of said second transformer being connected to said tip lead; first amplifier means connected to the primary winding of said first transformer for amplifying said first frequency shift keyed signal; and second amplifier means connected to the primary winding of said second transformer for amplifying said second frequency shift keyed signal.

7. For use with a telephone switching system serving a plurality of stations and having a central processor for generating a data message, said data message including unit identification and special service information, and also having a plurality of ringing circuits each for generating intermittent ringing signals separated by silent intervals to a selected one of said stations; apparatus for sending a data message to a selected station during a silent interval between intermittent ringing signals while the apparatus remains connected to the ringing circuit for generating ringing signals to the selected station; comprising:
    a plurality of units each connectable to an associated one of said ringing circuits for detecting a silent interval between the intermittent ringing signals from the associated ringing circuit; and
    controller means responsive to said unit identification for selecting one of said plurality of units to receive said special service information;
    said selected unit comprising means for sending said special service information to said selected station during the silent interval between the intermittent ringing signals from the associated ringing circuit.

8. The apparatus in accordance with claim 7 in which said selected station includes means for displaying said special service information.

9. The apparatus in accordance with claim 7 in which said controller means comprises a control circuit responsive to said unit identification for generating a unit address and unit selector means for selecting the unit identified by said unit address.

10. The apparatus in accordance with claim 7 in which each of said units comprises detector means responsive to the ringing signals from the associated ringing circuit for generating a status signal representative of the silent interval between the intermittent ringing signals from the associated ringing circuit and in which the means for sending in said selected unit is responsive to the status signal from the detector means for sending to said selected station a signal representative of said special service information during the silent interval between the intermittent ringing signals from the associated ringing circuit.

11. The apparatus in accordance with claim 9 in which said control circuit comprises processor means responsive to said data message for generating a check sum for said special service information.

12. For use with a telephone switching system serving a plurality of stations and having a central processor for generating special service information and also having a ringing circuit for transmitting to a selected one of said stations intermittent ringing signals separated by silent intervals, a method for sending special service information to a selected station during a silent interval between intermittent ringing signals while the ringing circuit remains connected for transmitting the intermittent ringing signals to the selected station; comprising the steps of:
    detecting a first one of said ringing signals to said selected station;
    detecting a first one of said silent intervals after said first ringing signal; and
    sending a signal representative of said special service information to said selected station during said first silent interval.

13. For use with a telephone switching system serving a plurality of stations and having a central processor for generating special service information and also having a ringing circuit for transmitting to a selected one of said stations intermittent ringing signals separated by silent intervals, a method for sending special service information to a selected station during a silent interval between intermittent ringing signals; comprising the steps of:
    detecting a first one of said ringing signals to said selected station;
    detecting a first one of said silent intervals after said first ringing signal;
    sending a signal representative of said special service information to said selected station during said first silent interval;
    waiting a first special time interval after said first ringing signal;
    confirming the continuance of said first silent interval after said first special time interval; and
    sending a signal representative of said special service information to said selected station during said first silent interval after confirming the continuance of said first silent interval.

to indicate that there is one less character byte in the data storage area (block 1504).

The data message sent to an on-hook called station during the silent interval between ringing signals may comprise any number of character bytes, each with additional start and stop bits. The first character of the message identifies the type of message such as, for example, calling/called directory number, special service indicator, personal messages, etc. The second character specifies the number of subsequent character bytes in the message. The next characters represent the digits of the calling station directory number. The last character sent to the called station is a check sum which the station set uses to verify that errors have not been introduced in transmission.

When the transmit buffer register of the UART is loaded, the character byte is serially shifted out of the transmit buffer register and sent to the FSK modem. The UART adds the start and stop bits, and the FSK modem sends each character as a two frequency (modulated) FSK signal to the called station. One carrier frequency represents the high logic levels of the data character; the other represents the low logic levels. Control is returned to the line unit routine. This DATA SEND subroutine is repeated unitl all the characters of the special service information along with the check sum have been sent to the called station.

Returning the reader's attention to block 1502, it can be seen that when the data storage area is empty, the microprocessor sets the state of the line unit status block to "idle" (block 1505) and resets the UART to stop sending an unmodulated FKS signal to the called station (block 1506). This is accomplished by the microprocessor reading even address bit A0 of the enabled line unit. Again, control is returned to the line unit routine.

Graphically depicted in FIG. 16 are idealized ringing and data message signals, which are sent to a called station plotted with respect to time as well as the state of the line unit status block. When connecting an associated line unit and ringing circuit to a called station, processor 108 sends to the data transmitter a data message which includes line unit identification, a data character count, and special service information such as the directory number of the calling station. The "idle" line unit status block of the identified line unit is loaded with the special service information and advanced to the "ringing detect" state. In addition, the ringing detector is reset to detect a ringing signal. Ringing circuit 133 then transmits ringing signal 1601 to called station 101 for a period of approximately two seconds which is normally followed by a silent interval of approximately 4 seconds before transmitting another ringing signal. When a ringing signal is detected on the line, the line unit ringing detector is set which is reported to microprocessor 201. The line unit status block is then advanced to the "silent interval detect" state to determine when the silent interval between ringing signals is entered.

When the line unit status block is in the "silent interval detect" state, the ringing detector continues to monitor the ring lead of the called station for a ringing signal. After each ringing interval such as 50 milliseconds, which is the period of a 20-hertz ringing signal, the ringing detector is polled unitl the ringing signal is no longer detected on the ring lead. Microprocessor 201 then advances the line unit status block to the "long silent interval confirm" state.

When the line unit status block is in the "long silent interval confirm" state, an additional silent interval such as, for example, 300 milliseconds is timed to assure that a ringing signal associated with a special service is not detected on the line. When another ringing signal such as 1602 is detected during this special silent interval, the line unit status block is, again, set to the "silent interval detect" state. The status block remains in this state until another silent interval has been detected.

When ringing signal 1602 is no longer detected on the ring lead, the line unit status block is once again set to the "long silent interval confirm" state. After the special silent interval has elapsed without detecting a ringing signal, the line unit status block is advanced to the "carrier send" state, and a single frequency carrier signal is sent to the called station. This "unmodulated" signal such as 1603 is maintained for a predetermined interval such as 90 milliseconds to assure that the called station set is initialized to receive the subsequent data message. Once the called station is initialized, the line unit status block is advanced to the "data send" state, and the special service information such as the directory number of the calling station is sequentially transmitted to the called station via a modulated FSK signal such as 1604. As suggested, this data message signal will include the message type, message length, and remaining special service information such as the directory number of the calling station followed by a message check sum. Other special service information such as the time of day, personal message, etc., may also be sent. The entire message is sent during the typical 4 second silent interval between ringing signals. After the message has been sent, the line unit status block is set to the "idle" state in preparation for the next called station transmission.

It is to be understood that the above-described data transmission arrangement is merely an illustrative embodiment of the principles of this invention and that numerous other arrangements may be devised by those skilled in the art without departing from the spirit and scope of the invention. In particular, the data transmitter arrangement may be modified to send special service information during successive silent intervals, or alternatively, modified to exchange special service information signals between the called station and transmitter to provide any number of special services.

What is claimed is:

1. For use with a telephone switching system serving a plurality of stations and having a central processor for generating a data message and a ringing circuit for transmitting a first and a second ringing signal to a selected one of said stations, said first and second ringing signals having a silent interval therebetween, apparatus for sending a data message to a selected station during the silent interval between ringing signals while the apparatus remains connected to the ringing circuit; comprising:

detector means connectable to said ringing circuit and responsive to said first ringing signal for generating a status signal representative of said silent interval between said first and second ringing signals; and sender means responsive to said status signal for sending to said selected station a signal representative of said data message during said silent interval.

2. The apparatus in accordance with claim 1 in which said apparatus further comprises coupler means for coupling said sender means to said ringing circuit.

14. The method as set forth in claim 13 wherein said method further comprises the steps of:
- responsive to detecting a second one of said ringing signals to said selected station during said first special time interval, detecting a second one of said silent intervals after said second ringing signal;
- waiting a second special time interval after said second ringing signal;
- confirming the continuance of said second silent interval after said second special time interval has elapsed; and
- sending a signal representative of said special service information to said selected station during said second silent interval after confirming the continuance of said second silent interval.

15. The method set forth in claim 12 in which said special service information also comprises a message type and wherein said method further comprises the step of sending to said selected station a signal representative of said message type.

16. The method set forth in claim 15 wherein said method further comprises the steps of generating a message length representative of the length of said special service information and sending a signal representative of said message length after sending said message type.

17. The method set forth in claim 16 wherein said method further comprises the steps of generating a message check sum for said special services information and said message length and sending a signal representative of said message check sum after sending said special service information and said message length.

18. For use with a telephone switching system serving a plurality of stations and having a central processor for generating special service information and also having a ringing circuit for transmitting to a selected one of said stations intermittent ringing signals separated by silent intervals, a method for displaying special service information at a selected station during a silent interval between intermittent ringing signals while the ringing circuit remains connected for transmitting the intermittent ringing signals to the selected station; comprising the steps of:
- sending a signal representative of said special service information to said selected station during an interval of said silent intervals separating said ringing signals;
- receiving said representative signal at said selected station during said silent interval; and
- displaying said special service information at said selected station during said silent interval.

19. The method as set forth in claim 18 in which said silent interval is a first one of said silent intervals and wherein said step of sending a signal representative of said special service information comprises the steps of:
- detecting a first one of said ringing signals to said selected station;
- detecting said first silent interval after said first ringing signal; and
- sending said representative signal to said selected station during said first silent interval.

20. For use with a telephone switching system serving a plurality of stations and having a central processor for generating special service information and also having a ringing circuit for transmitting to a selected one of said stations intermittent ringing signals separated by silent intervals, a method for displaying special service information at a selected station during a silent interval between intermittent ringing signals; comprising the steps of:
- detecting a first one of said ringing signals to said selected station;
- detecting a first one of said silent intervals after said first ringing signal;
- waiting a special time interval after said first ringing signal;
- confirming the continuance of said first silent interval after said special time interval;
- sending a signal representative of said special service information to said selected station during said first silent interval after confirming the continuance of said first silent interval;
- receiving said representative signal at said selected station during said silent interval; and
- displaying said special service information at said selected station during said silent interval.

21. For use with a telephone switching system serving a plurality of stations and having a central processor for generating special service information and also having a ringing circuit for transmitting intermittent ringing signals separated by silent intervals to a selected one of said stations, apparatus for displaying special service information at a selected station during a silent interval between intermittent ringing signals while the apparatus remains coupled to the ringing circuit; comprising:
- means coupled to said ringing circuit for sending a signal representative of said special service information to said selected station during an interval of said silent intervals separating said ringing signals;
- means for receiving said representative signal at said selected station during said silent interval; and
- means for displaying said special service information at said selected station during said silent interval.

22. The apparatus in accordance with claim 21 wherein said silent interval is a first one of said silent intervals and in which said means for sending a signal representative of said special service information comprises:
- means for detecting a first one of said ringing signals to a selected station;
- means for detecting said first silent interval after said first ringing signal; and
- means for sending said representative signal to said selected station during said first silent interval.

23. For use with a telephone switching system serving a plurality of stations and having a central processor for generating special service information and also having a ringing circuit for transmitting intermittent ringing signals separated by silent intervals to a selected one of said stations, apparatus for displaying special service information at a selected station during a silent interval between intermittent ringing signals, comprising:
- means for detecting a first one of said ringing signals to said selected station;
- means for detecting said first silent interval after said first ringing signal;
- means for waiting a special time interval after said first ringing signal;
- means for confirming the continuance of said first silent interval after said special time interval;
- means for sending a signal representative of said data message to said selected station during said first silent interval after confirming the continuance of said first silent interval;
- means for receiving said representative signal at said selected station during said silent interval; and
- means for displaying said special service information at said selected station during said silent interval.

* * * * *

REEXAMINATION CERTIFICATE (2603rd)

United States Patent [19]

Doughty

[11] B1 4,551,581

[45] Certificate Issued Jun. 20, 1995

[54] METHOD AND APPARATUS FOR SENDING A DATA MESSAGE TO A SELECTED STATION DURING A SILENT INTERVAL BETWEEN RINGING

[75] Inventor: Carolyn A. Doughty, Wheaton, Ill.

[73] Assignee: Bell Telephone Laboratories, Murray Hill, N.J.

Reexamination Requests:
No. 90/002,776, Jul. 9, 1992
No. 90/003,272, Dec. 13, 1993

Reexamination Certificate for:
Patent No.: 4,551,581
Issued: Nov. 5, 1985
Appl. No.: 512,955
Filed: Jul. 12, 1983

[51] Int. Cl.[6] .................................... H04M 11/00
[52] U.S. Cl. .................................... 379/94; 379/201; 379/372
[58] Field of Search .................. 379/93, 94, 96–98, 379/142, 201, 207, 372, 373, 376, 90, 110, 127, 130, 133, 140, 199, 247, 173, 290

[56] References Cited

U.S. PATENT DOCUMENTS 4,289,931  9/1981  Baker .

FOREIGN PATENT DOCUMENTS 2538820  3/1977  Germany .

*Primary Examiner*—Wing F. Chan

[57] ABSTRACT

For use with a telephone switching system serving a plurality of stations and having a central processor for generating data messages and a ringing circuit for generating ringing signals to a selected station, method and apparatus are disclosed for sending a data message to a selected station during a silent interval between ringing signals. The apparatus includes a detector and a sender. Responsive to a first ringing signal, the detector generates a status signal representative of the silent interval between ringing signals. During the silent interval, the sender sends to the selected station a frequency shift keyed signal representative of the data message.

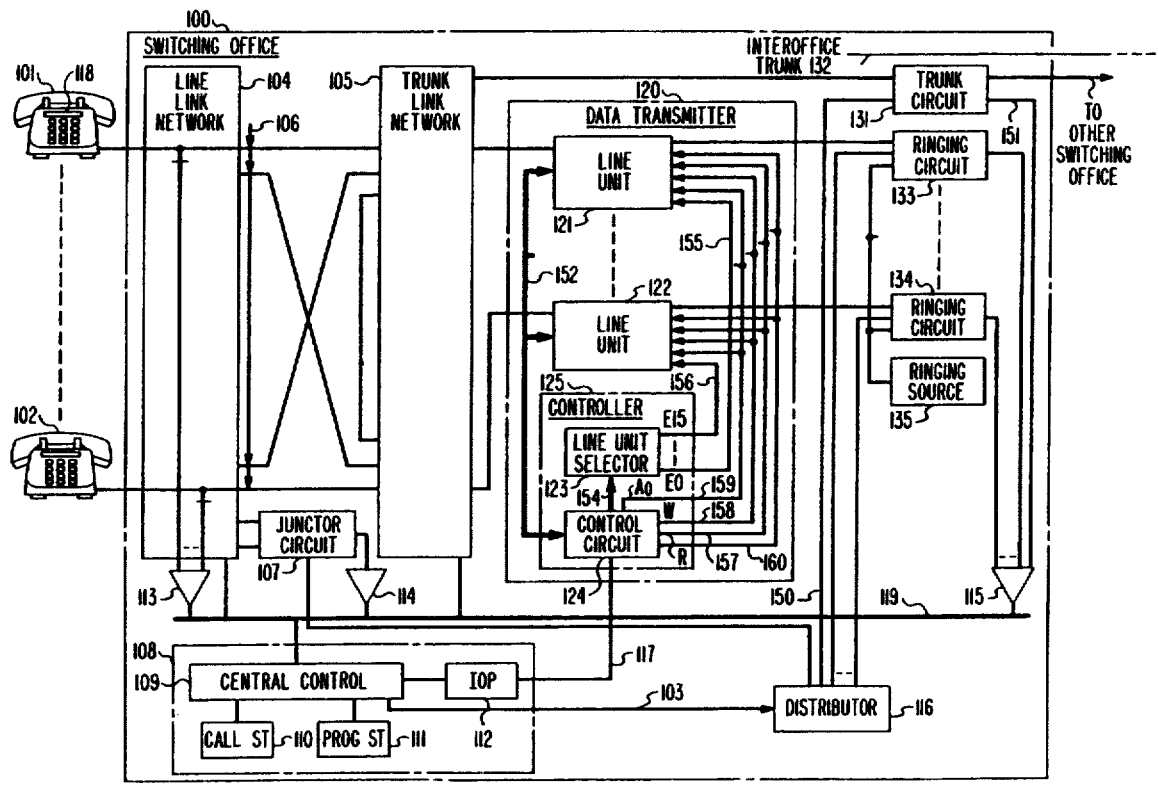

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13, 14, 20, and 23 is confirmed.

Claims 1, 5, 7, 12, 18, and 21 are determined to be patentable as amended.

Claims 2–4, 6, 8–11, 15–17, 19 and 22 dependent on an amended claim, are determined to be patentable.

New claims 24–28 are added and determined to be patentable.

1. For use with a telephone switching system serving a plurality of stations and having a central processor for generating a data message and a ringing circuit for transmitting a first and a second ringing signal to a selected one of said stations, said first and second ringing signals having a silent interval therebetween, apparatus for sending a data message to a selected station during the silent interval between ringing signals while the apparatus remains connected to the ringing circuit; comprising:

detector means connectable to said ringing circuit and responsive to said first ringing signal for generating a status signal representative of said silent interval between said first and second ringing signals; and sender means responsive to said status signal for sending to said selected station a signal representative of said data message during said silent interval;

*wherein the signal sent during said silent interval comprises a period of unmodulated signal, followed by a modulated signal representing said data message.*

5. For use with a telephone switching system serving a plurality of stations and having a central processor for generating a data message and a ringing circuit for transmitting a first and a second ringing signal to a selected one of said stations, said first and second ringing signals having a silent interval therebetween, apparatus for sending a data message to a selected station during the silent interval between ringing signals; comprising:

detector means responsive to said first ringing signal for generating a status signal representative of said silent interval between said first and second ringing signals;

sender means responsive to said status signal for sending to said selected station a first frequency shift keyed signal representative of said data message during said silent interval; and means responsive to said first frequency shift keyed signal for generating a second frequency shift keyed signal having a voltage level equivalent in magnitude and opposite in polarity to that of said first frequency shift keyed signal;

*wherein the signal sent during said silent interval comprises a period of unmodulated signal, followed by a modulated signal representing said data message.*

7. For use with a telephone switching system serving a plurality of stations and having a central processor for generating a data message, said data message including unit identification and special service information, and also having a plurality of ringing circuits each for generating intermittent ringing signals separated by silent intervals to a selected one of said stations; apparatus for sending a data message to a selected station during a silent interval between intermittent ringing signals while the apparatus remains connected to the ringing circuit for generating ringing signals to the selected station; comprising:

a plurality of units each connectable to an associated one of said ringing circuits for detecting a silent interval between the intermittent ringing signals from the associated ringing circuit; and controller means responsive to said unit identification for selecting one of said plurality of units to receive said special service information;

said selected unit comprising means for sending said special service information to said selected station during the silent interval between the intermittent ringing signals from the associated ringing circuit;

*wherein the signal sent during said silent interval comprises a period of unmodulated signal, followed by a modulated signal representing said data message.*

12. For use with a telephone switching system serving a plurality of stations and having a central processor for generating special service information and also having a ringing circuit for transmitting to a selected one of said stations intermittent ringing signals separated by silent intervals, a method for sending special service information to a selected station during a silent interval between intermittent ringing signals while the ringing circuit remains connected for transmitting the intermittent ringing signals to the selected station; comprising the steps of:

detecting a first one of said ringing signals to said selected station;

detecting a first one of said silent intervals after said first ringing signal; and sending a signal representative of said special service information to said selected station during said first silent interval;

*wherein the signal sent during said silent interval comprises a period of unmodulated signal, followed by a modulated signal representing said special service information.*

18. For use with a telephone switching system serving a plurality of stations and having a central processor for generating special service information and also having a ringing circuit for transmitting to a selected one of said stations intermittent ringing signals separated by silent intervals, a method for displaying special service information at a selected station during a silent interval between intermittent ringing signals while the ringing circuit remains connected for transmitting the intermittent ringing signals to the selected station; comprising the steps of:

sending a signal representative of said special service information to said selected station during an interval of said silent intervals separating said ringing signals;

wherein the signal sent during said silent interval comprises a period of unmodulated signal, followed by a modulated signal representing said special service information receiving said representative signal at said selected station during said silent interval; and displaying said special service information at said selected station during said silent interval.

21. For use with a telephone switching system serving a plurality of stations and having a central processor for generating special service information and also having a ringing circuit for transmitting intermittent ringing signals separated by silent intervals to a selected one of said stations, apparatus for displaying special service information at a selected station during a silent interval between intermittent ringing signals while the apparatus remains coupled to the ringing circuit; comprising:

means coupled to said ringing circuit for sending a signal representative of said special service information to said selected station during an interval of said silent intervals separating said ringing signals;

wherein the signal sent during said silent interval comprises a period of unmodulated signal, followed by a modulated signal representing said special service information;

means for receiving said representative signal at said selected station during said silent interval; and means for displaying said special service information at said selected station during said silent interval.

24. for use with a telephone switching system serving a plurality of stations and having a central processor for generating a data message and a ringing circuit for transmitting a first and a second ringing signal to a selected one of said stations, said first and second ringing signals having a silent interval therebetween, apparatus for sending a data message to a selected station during the silent interval between ringing signals while the apparatus remains connected to the ringing circuit; comprising:

detector means connectable to said ringing circuit and responsive to said first ringing signal for generating a status signal representative of said silent interval between said first and second ringing signals; and sender means responsive to said status signal for sending to said selected station a signal representative of said data message during said silent interval, subsequent to the lapse of a first period of time during which first period no frequency shift key (FSK) signal is transmitted;

wherein said signal representative of said data message comprises an unmodualted FSK carrier signal lasting a second period of time followed by a modulated FSK signal, the information of the data message being conveyed by the modulated signal.

25. For use with a telephone switching system serving a plurality of stations and having a central processor for generating a data message, said data message including unit identification and special service information, and also having a plurality of ringing circuits each for generating intermittent ringing signals separated by silent intervals to a selected one of said stations; apparatus for sending a data message to a selected station during a silent interval between intermittent ringing signals while the apparatus remains connected to the ringing circuit for generating ringing signals to the selected station; comprising:

a plurality of units each connectable to an associated one of said ringing circuits for detecting a silent interval between the intermittent ringing signals from the associated ringing circuit; and controller means responsive to said unit identification for selecting one of said plurality of units to receive said special service information;

said selected unit comprising means for sending said special service information via a signal to said selected station during the silent interval between the intermittent ringing signals from the associated ringing circuit subsequent to the lapse of a first period of time during which first period no frequency shift key (FSK)signal is transmitted;

wherein said special service information is sent via a signal representative of said special service information, said signal representative of said special service information comprising an unmodulated FSK carrier signal lasting a second period of time followed by a modulated FSK signal, the special services information being conveyed by the modulated signal.

26. For use with a telephone switching system serving a plurality of stations and having a central processor for generating special service information and also having a ringing circuit for transmitting to a selected one of said stations intermittent ringing signals separated by silent intervals, a method for sending special service information to a selected station during a silent interval between intermittent ringing signals while the ringing circuit remains connected for transmitting the intermittent ringing signals to the selected station; comprising the steps of:

detecting a first one of said ringing signals to said selected station;

detecting a first one of said silent intervals after said first ringing signal; and sending a signal representative of said special service information to said selected station during said first silent interval subsequent to the lapse of a first period of time during which first period no frequency shift key (FSK) signal is transmitted;

wherein said signal representative of said service information comprises an unmodualted FSK carrier signal lasting a second period of time followed by a modulated FSK signal for conveying said special service information.

27. For use with a telephone switching system serving a plurality of stations and having a central processor for generating special service information and also having a ringing circuit for transmitting to a selected one of said stations intermittent ringing signals separated by silent intervals, a method for displaying special service information at a selected station during a silent interval between intermittent ringing signals while the ringing circuit remains connected for transmitting the intermittent ringing signals to the selected station; comprising the steps of:

sending a signal representative of said special service information to said selected station during one of said silent intervals separating said ringing signals subsequent to the lapse of a first period of time during which first period no frequency shaft key (FSK) signal is transmitted;

receiving said representative signal at said selected station during said one silent interval; and displaying said special service information at said selected station during said one silent interval subsequent to the lapse of a first period of time during which first period no frequency shift key (FSK) signal is transmitted;

wherein said signal representative of said special service information comprises an unmodulated FSK carrier signal followed by a modulated FSK signal, the special services information being conveyed by the modulated signal.

28. For use with a telephone switching serving a plurality of stations and having a central processor for generating special service information and also having a ringing circuit for transmitting intermittent ringing signals separated by silent intervals to a selected one of said stations, apparatus for displaying special service information at a selected station during a silent interval between intermittent ringing signals while the apparatus remains coupled to the ringing circuit; comprising:

means coupled to said ringing circuit for sending a signal representative of said special service information to said selected station during one of said silent intervals separating said ringing signals subsequent to the lapse of a first period of time during which first period no FSK signal is transmitted;

means for receiving said representative signal at said selected station during said one silent interval; and means for displaying said special service information at said selected station during said one silent interval;

wherein said signal representative of said special service information comprises an unmodualted FSK carrier signal lasting a second period of time followed by a modulated FSK signal, the special services information being conveyed by the modualted signal.

* * * * *